(12) United States Patent
Shechter et al.

(10) Patent No.: US 8,885,902 B2
(45) Date of Patent: Nov. 11, 2014

(54) INTERPOLATION FREE FAN-TO-PARALLEL BEAM RE-BINNING

(75) Inventors: Gilad Shechter, Haifa (IL); Amir Livne, Zikhron Ya'akov (IL)

(73) Assignee: Koninklijke Philips N.V., Eindhoven (NL)

( * ) Notice: Subject to any disclaimer, the term of this patent is extended or adjusted under 35 U.S.C. 154(b) by 389 days.

(21) Appl. No.: 13/266,584

(22) PCT Filed: Apr. 14, 2010

(86) PCT No.: PCT/IB2010/051628
§ 371 (c)(1),
(2), (4) Date: Oct. 27, 2011

(87) PCT Pub. No.: WO2010/133983
PCT Pub. Date: Nov. 25, 2010

(65) Prior Publication Data
US 2012/0051618 A1 Mar. 1, 2012

Related U.S. Application Data

(60) Provisional application No. 61/179,117, filed on May 18, 2009.

(51) Int. Cl.
*G06K 9/00* (2006.01)
*G06T 11/00* (2006.01)
(52) U.S. Cl.
CPC .................................... *G06T 11/005* (2013.01)
USPC ............ 382/131; 382/128; 382/130; 382/132

(58) Field of Classification Search
None
See application file for complete search history.

(56) References Cited

U.S. PATENT DOCUMENTS

| | | | |
|---|---|---|---|
| 4,623,825 A * | 11/1986 | Wahlquist et al. | 315/368.17 |
| 4,769,757 A | 9/1988 | Horiba et al. | |
| 4,992,941 A * | 2/1991 | Bruening et al. | 378/12 |
| 5,307,264 A | 4/1994 | Waggener et al. | |
| 6,125,193 A | 9/2000 | Han | |
| 6,173,032 B1 | 1/2001 | Besson | |
| 6,937,697 B2 | 8/2005 | Nishide et al. | |
| 7,245,755 B1 | 7/2007 | Pan et al. | |
| 2005/0175143 A1* | 8/2005 | Miyazaki et al. | 378/19 |
| 2006/0198491 A1* | 9/2006 | Taguchi | 378/15 |

FOREIGN PATENT DOCUMENTS

| | | |
|---|---|---|
| WO | 2004075115 A1 | 9/2004 |
| WO | WO 2008068691 A3 * | 7/2009 |

OTHER PUBLICATIONS

Defrise, M., et al.; Rebinning-based algorithms for helical cone-beam CT; 2001; Phys. Med. Biol.; 46:2911-2937.

* cited by examiner

*Primary Examiner* — Matthew Bella
*Assistant Examiner* — Weiwen Yang

(57) ABSTRACT

A fan-to-parallel beam re-binner includes a time deflection determiner that determines time deflections for a plurality of integration periods for different detector pixels of an imaging system, a data shifter that shifts fan beam data acquired for the integration periods by the system by time offsets corresponding to the time deflections; and a data re-sorter that parallelizes the data.

20 Claims, 9 Drawing Sheets

US 8,885,902 B2

INTERPOLATION FREE FAN-TO-PARALLEL BEAM RE-BINNING

CROSS REFERENCE TO RELATED APPLICATIONS

Figure 1:
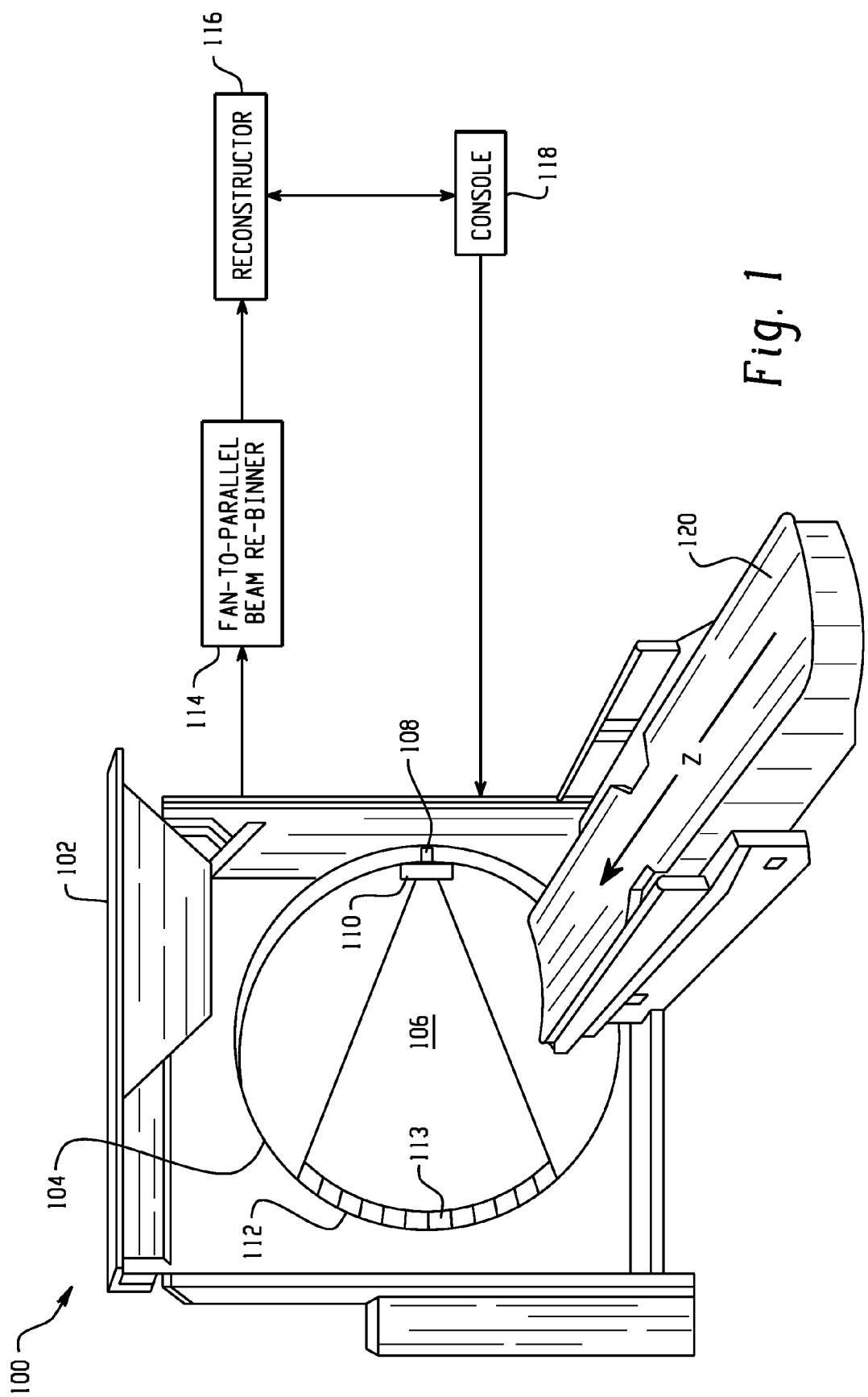

This application claims the benefit of U.S. provisional application Ser. No. 61/179,117 filed May 18, 2009, which is incorporated herein by reference.

DESCRIPTION

The following generally relates to parallel beam reconstruction and finds particular application to computed tomography (CT).

A computed tomography (CT) scanner generally includes an x-ray tube mounted on a rotatable gantry that rotates around an examination region about a longitudinal or z-axis and emits radiation such as a fan beam of radiation. A detector array subtends an angular arc opposite the examination region from the x-ray tube. The detector array detects radiation that traverses the examination region and generates projection data indicative thereof. A reconstructor reconstructs the projection data and generates volumetric image data indicative thereof. The volumetric image data can be processed to generate one or more images indicative of the scanned subject or object.

The reconstructor reconstructs the projection data with a reconstruction algorithm such as a filtered back-projection reconstruction algorithm or other reconstruction algorithm. A filtered back-projection reconstruction algorithm can be performed using fan beam geometry data (fan beam reconstruction) or parallel beam geometry data, after fan-to-parallel beam re-binning (parallel beam reconstruction). Fan beam reconstruction may lead to non-uniform image noise propagation. Parallel beam reconstruction mitigates the propagation of the non-uniform image noise.

Unfortunately, parallel beam reconstruction has required a fan-to-parallel angular interpolation, and this interpolation may reduce the spatial resolution of the reconstructed image. In addition, performing a parallel beam reconstruction with a non-enhancing interpolation kernel (e.g. a simple linear interpolation) tends to increase the level of image streak artifacts. The increase in streak artifacts can be reduced by increasing the number of interpolated parallel projections. However, increasing the number of projections to be filtered and back-projected slows down the reconstruction. Performing the parallel beam reconstruction with an enhancing interpolation kernel generally compensates for the loss of spatial resolution, but may increase image noise and the degree of streak artifacts.

Aspects of the present application address the above-referenced matters and others.

According to one aspect, a fan-to-parallel beam re-binner includes a time deflection determiner that determines time deflections for a plurality of integration periods for different detector pixels of an imaging system; a data shifter that shifts fan beam data acquired for the integration periods by the system by time offsets corresponding to the time deflections, and a data re-sorter that parallelizes the data.

In another embodiment, a method includes performing a fan beam scan in which at least two data acquisition integration periods for different detector pixels of an imaging system are shifted with time offsets with respect to each other; and parallelizing data from the fan beam scan based on the shifted integration periods.

In another embodiment, a method includes obtaining fan beam data, converting the fan beam data to parallel beam data without angular interpretation, and reconstructing an image based on the parallel beam data.

The invention may take form in various components and arrangements of components, and in various steps and arrangements of steps. The drawings are only for purposes of illustrating the preferred embodiments and are not to be construed as limiting the invention.

Figure 2:
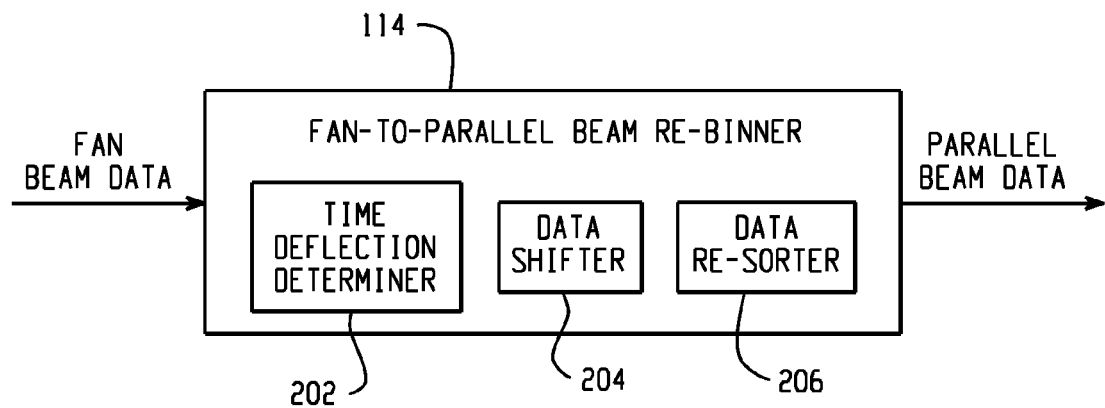
Figure 3:
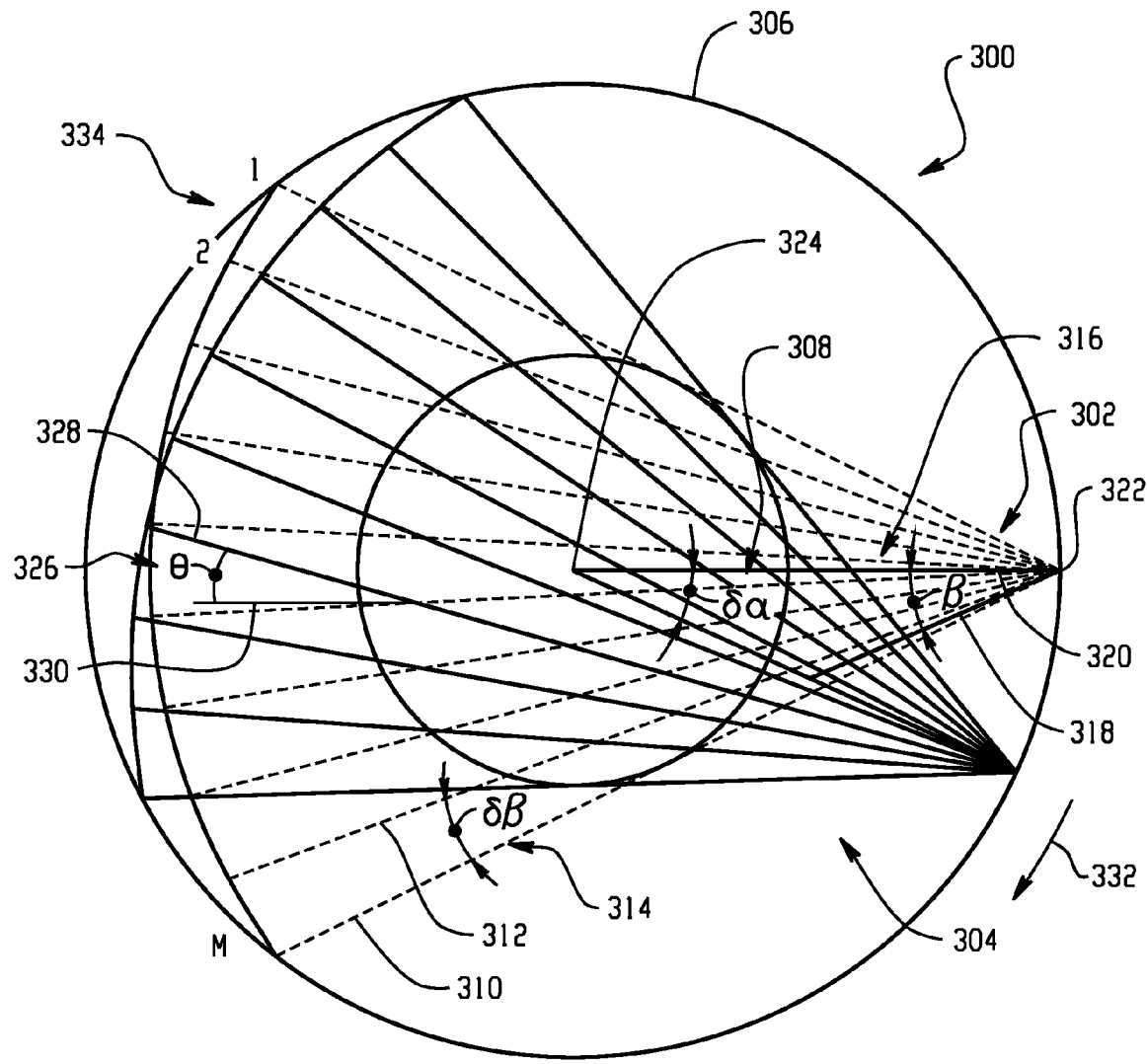
Figure 4:
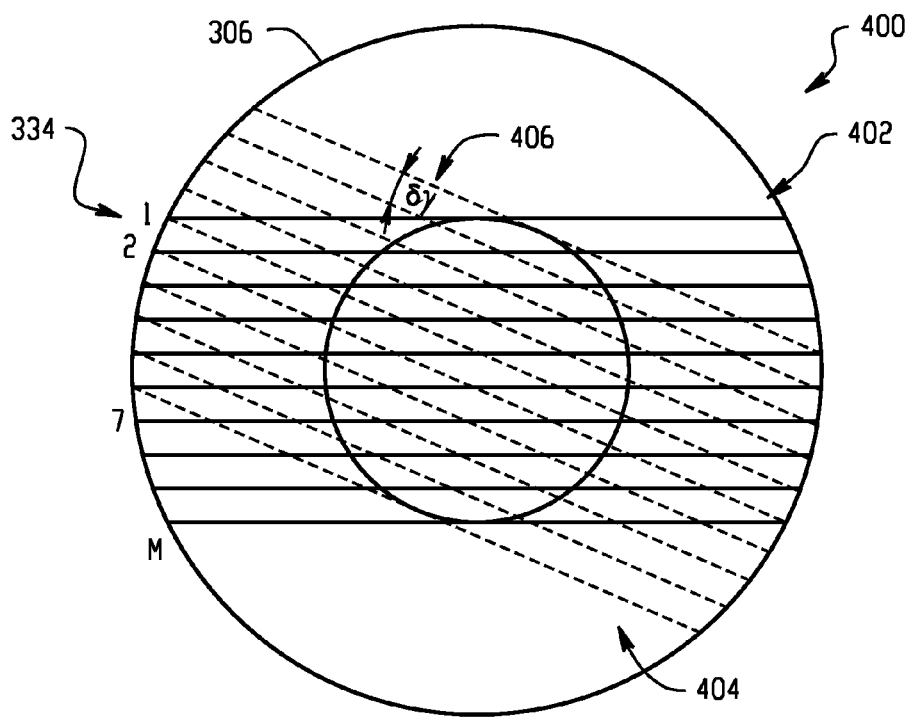
Figure 5:
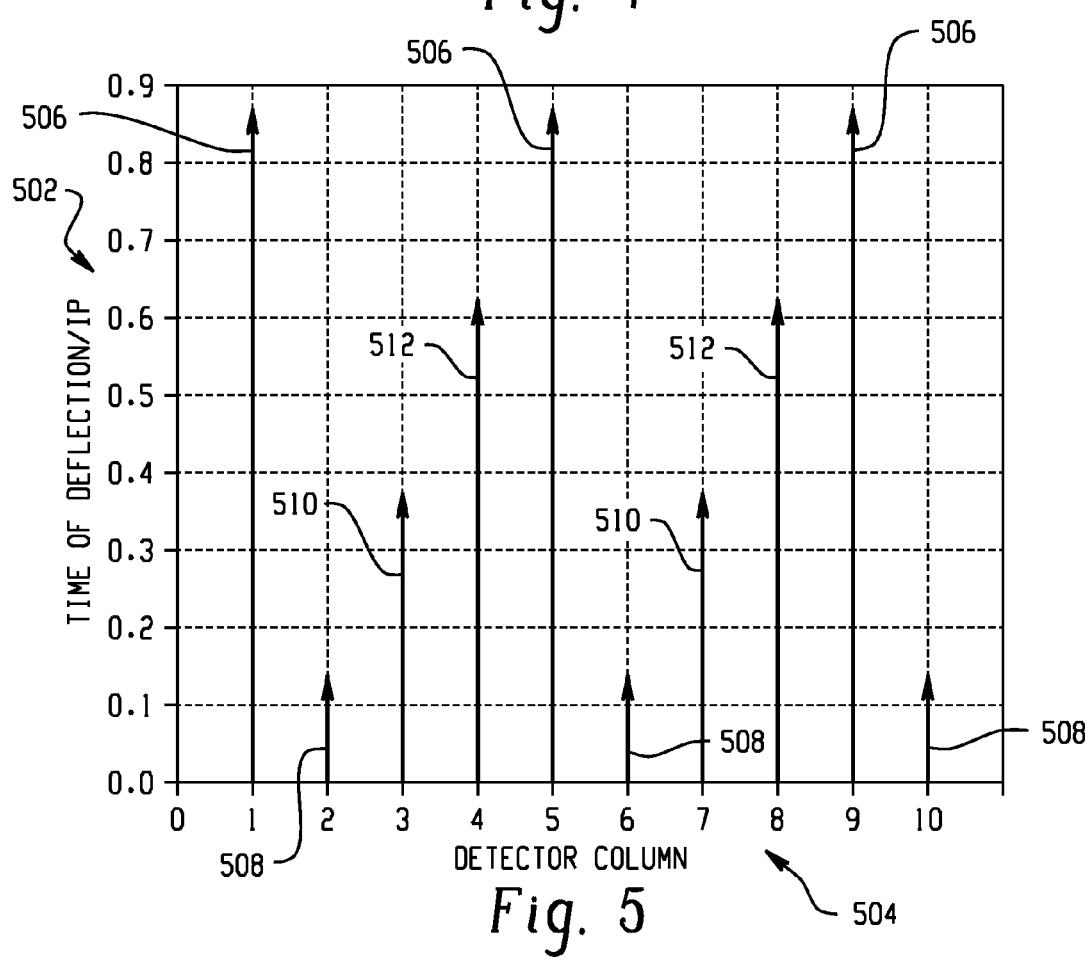
Figure 6:
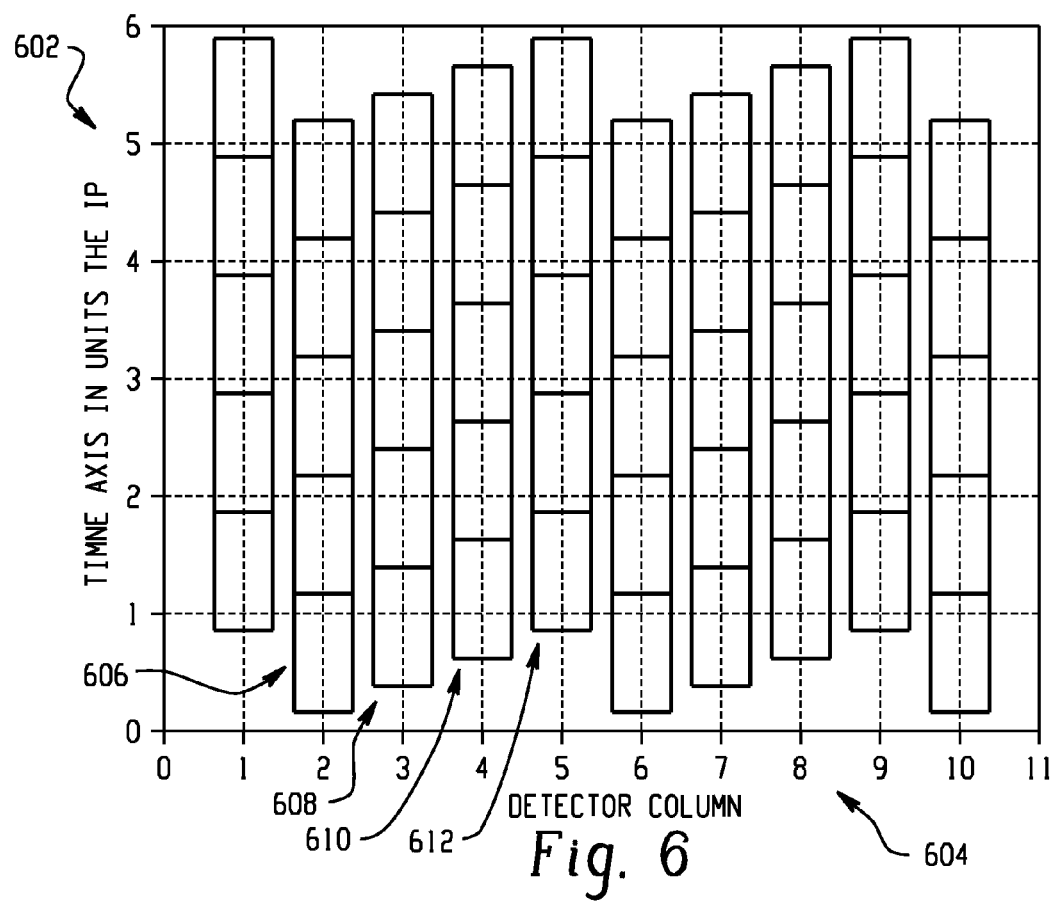
Figure 7:
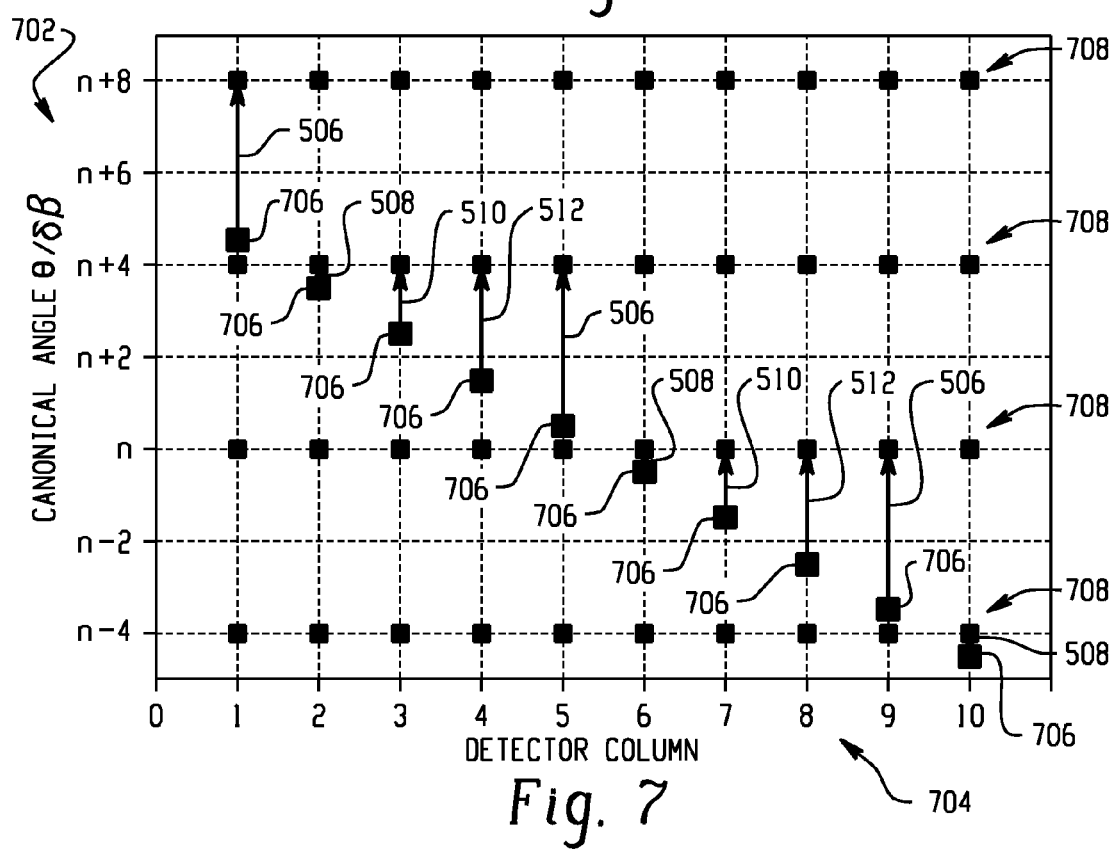
Figure 8:
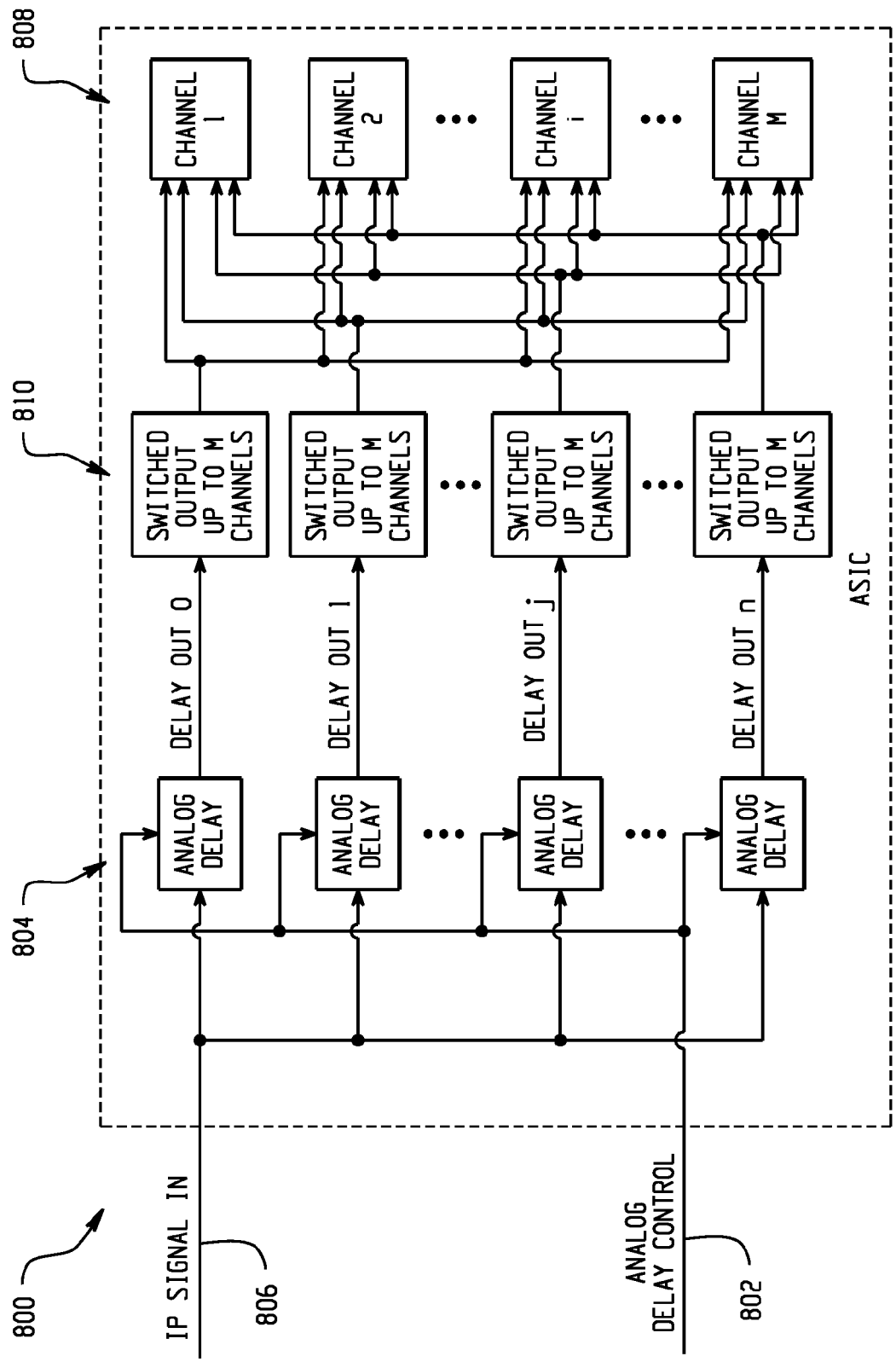
Figure 9:
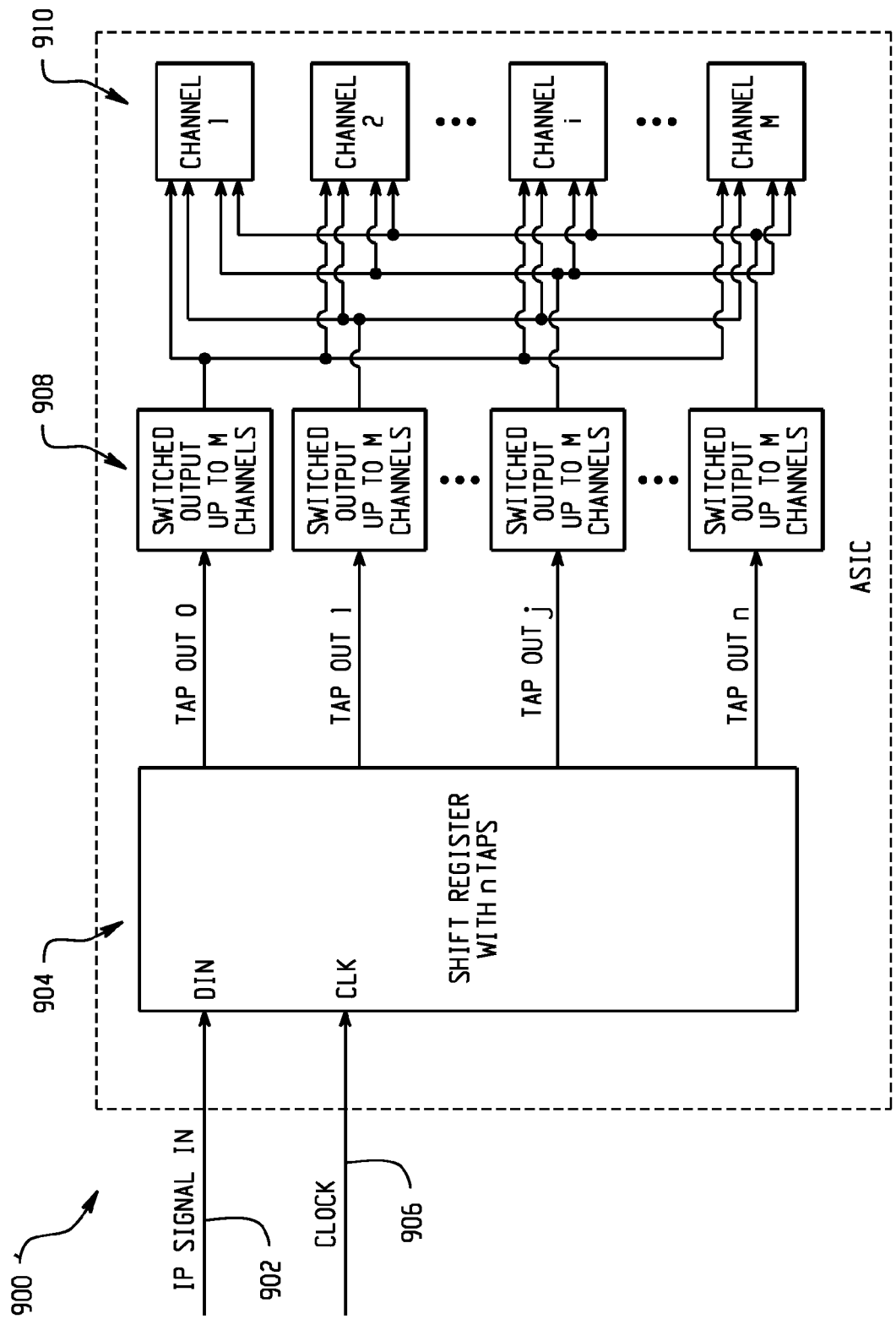
Figure 10:
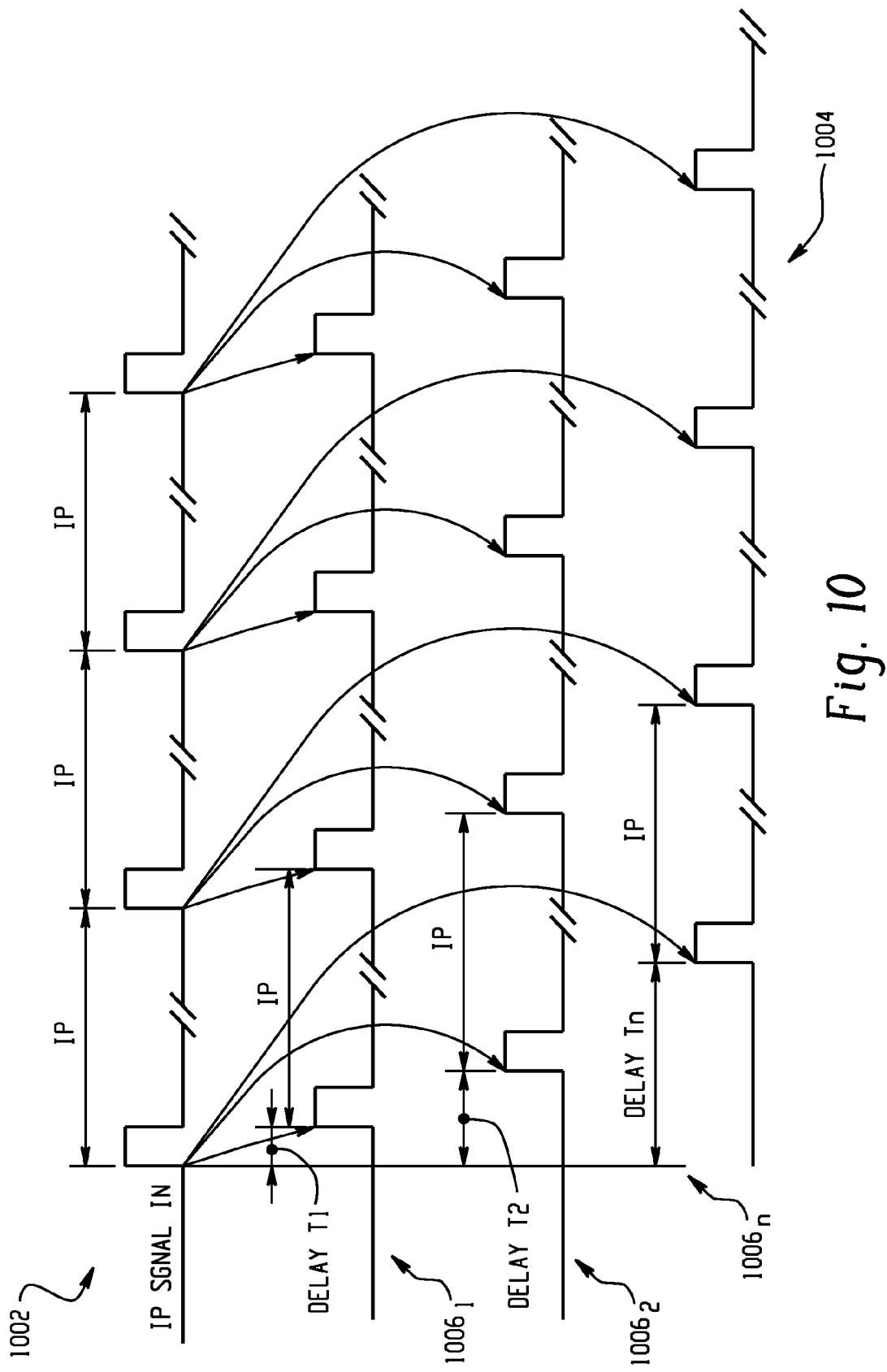
Figure 11:
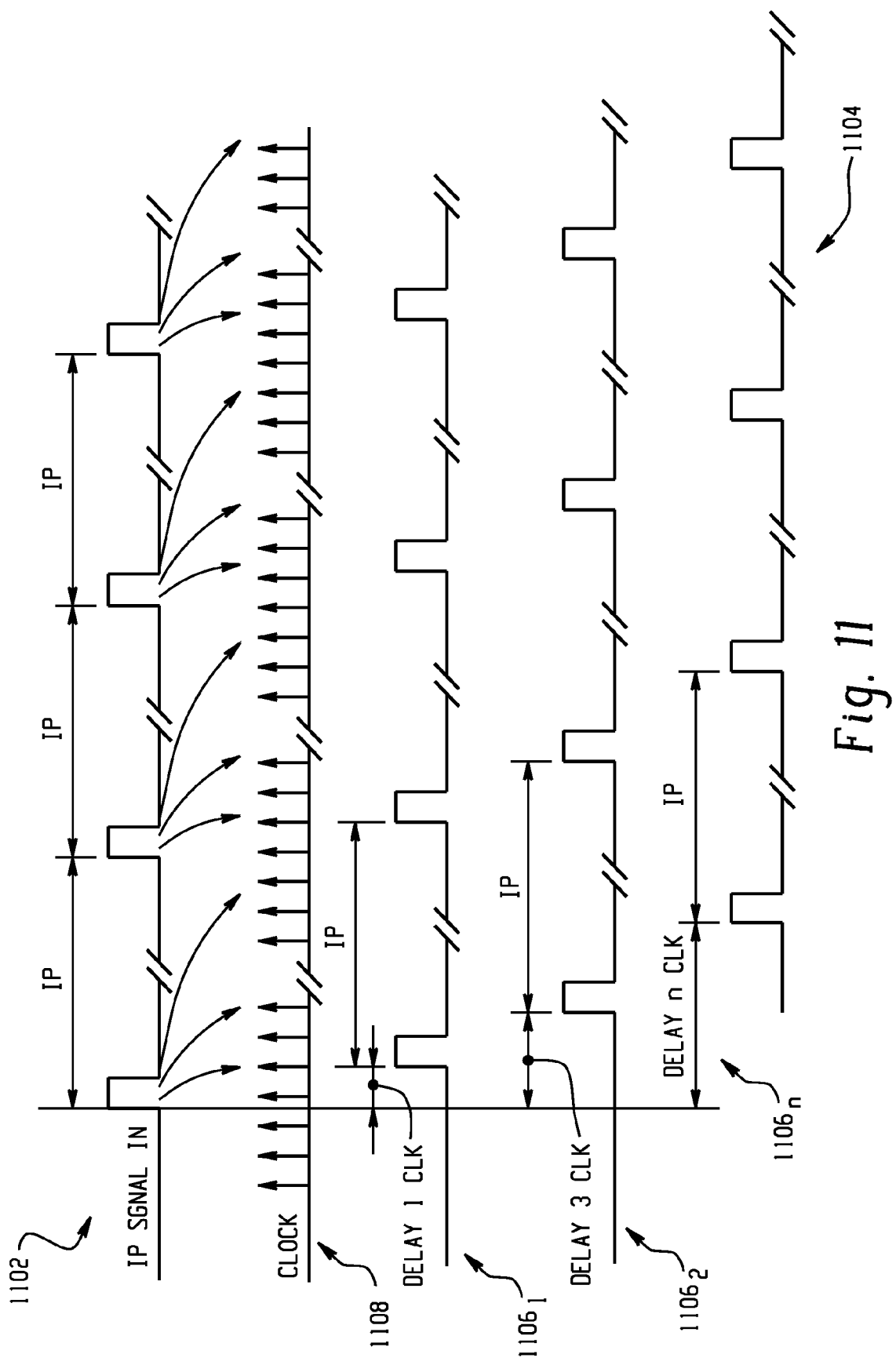
Figure 12:
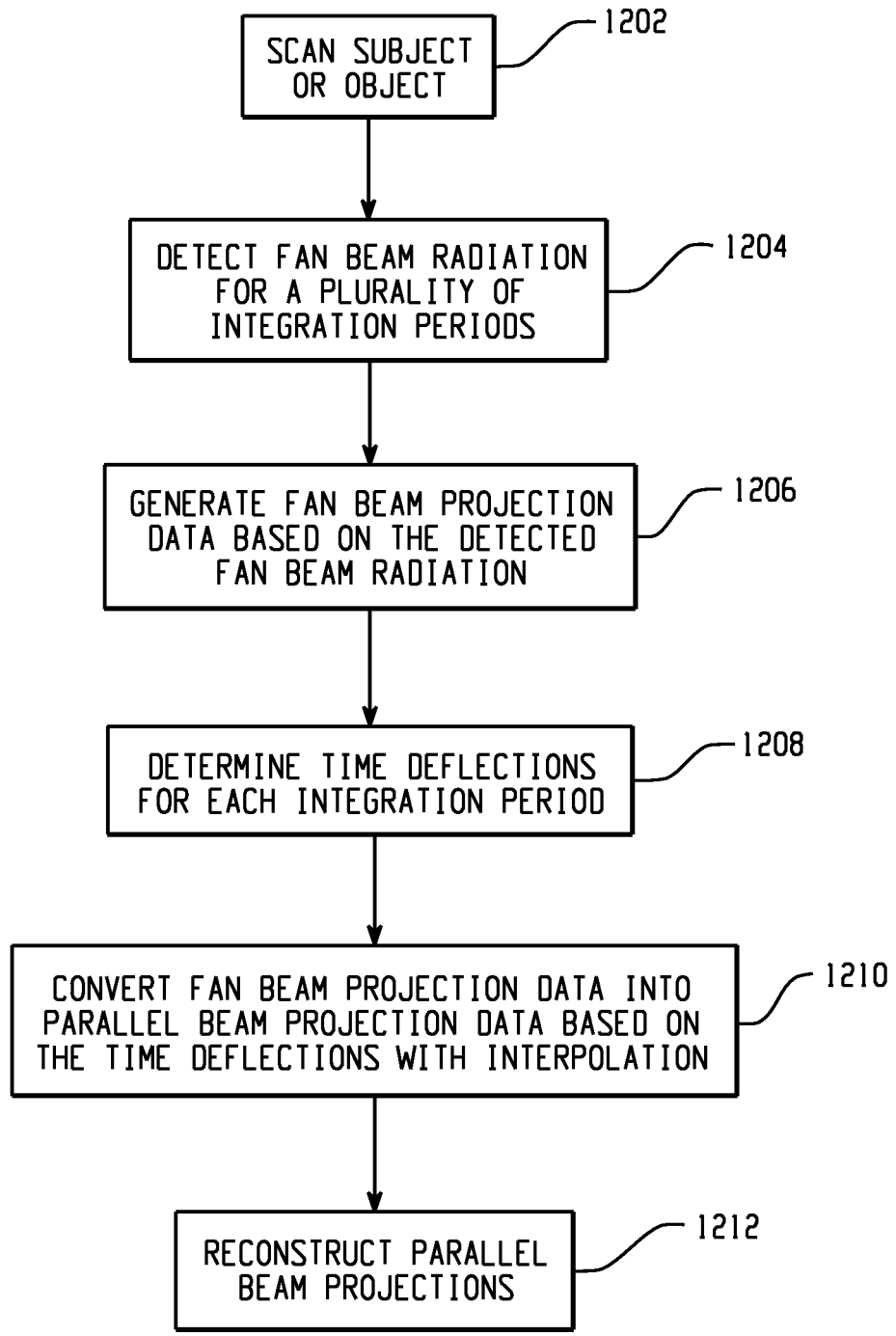

FIG. 1 illustrates an example imaging system.
FIG. 2 illustrates an example fan-to-parallel beam re-binner.
FIG. 3 illustrates example fan beam geometry.
FIG. 4 illustrates example parallel beam geometry.
FIGS. 5 and 6 graphically illustrate examples of time deflections.
FIG. 7 graphically illustrates data shifted by time deflections.
FIG. 8 illustrates an example analog implementation.
FIG. 9 illustrates an example digital implementation.
FIG. 10 illustrates an example timing diagram for FIG. 8.
FIG. 11 illustrates an example timing diagram for FIG. 9.
FIG. 12 illustrates an example method.

FIG. 1 illustrates an imaging system 100 such as a CT scanner. The imaging system 100 includes a stationary gantry 102 and a rotating gantry 104, which is rotatably supported by the stationary gantry 102 and rotates around an examination region 106 about a rotating frame rotation center along a longitudinal or z-axis.

A radiation source 108, such as an x-ray tube, is supported by the rotating gantry 104. The radiation source 108 emits radiation that traverse the examination region 106. In the illustrated embodiment, a source collimator 110 collimates the emitted radiation to form a generally fan shaped radiation beam that traverses the examination region 106. In another embodiment, the source collimator 110 collimates the emitted radiation to form a generally cone, wedge or otherwise shaped beam.

A radiation sensitive detector array 112 subtends an angular arc opposite the radiation sources 108 across the examination region 106. The illustrated detector array 112 is cylindrically shaped. In other embodiments, the detector array 112 is otherwise shaped, including arbitrarily shaped. The radiation sensitive detector array 112 includes a one or two-dimensional array of columns of detector pixels 113 that detect radiation traversing the examination region 106 for a plurality of integration periods during data acquisition. In the illustrated embodiment, the detector array 112 generates fan beam projection data indicative of the detected radiation for each integration period (IP).

A fan-to-parallel beam re-binner 114 re-bins the fan beam data generated by the detector array 112, generating parallel beam data therefrom. As described in greater detail below, in one non-limiting instance the data is corrected or compensated for time offsets between the integration periods for the different detector pixels 113. As such, the re-binner 114 can re-bin the data without angular interpolating the data, which may mitigate decreases in performance (e.g., decreased spatial resolution, increased streak artifact, increased computation time, etc.) associated with scanner configurations in which an angular interpolation is used for re-binning.

A reconstructor 116 reconstructs the parallel beam projection data based on a parallel beam reconstruction algorithm and generates volumetric image data indicative thereof. Suitable reconstruction algorithms include, but are not limited to, approximate, exact, and iterative reconstruction algorithms. Reconstructing the parallel beam projection data may lead to more uniform image noise relative to a configuration in which the reconstructor 116 utilizes a fan beam reconstruction algorithm and the fan beam projection data.

For approximate methods, the interpolation-free fan-to-parallel re-sorting can be performed before filtering and back-projection. For exact methods based on a three-dimensional Fourier composition, the interpolation-free fan-to-parallel re-sorting can be performed before back-projection. For iterative cone beam CT reconstruction, which is performed with less computational effort using a fan-to-parallel re-binning prior to the iterations, the interpolation free fan-to-parallel re-sorting offered can speed-up the iteration time while maintaining the full benefit of the iterative reconstruction.

A general-purpose computing system serves as an operator console 118. Software resident on the console 118 allows the operator to control the operation of the system 100, for example, by selecting a scanning protocol employing a parallel beam reconstruction, etc. A patient support 120, such as a couch, supports an object or subject in the examination region 106.

Turning to FIG. 2, a non-limiting example of the re-binner 114 is illustrated. As noted above, the fan-to-parallel beam re-binner 114 corrects or compensates for time offsets between detector pixels 113 for each integration period. The time offsets relate to differences in the locations of the integration periods along the time axis.

More particularly, the signals measured by the different pixels 113 are read with time offsets with respect to each other. As such, the locations of the integration periods along the time axis are not common to all of the detector pixels 113. A time deflection determiner 202 determines time deflections, which corresponds to these time offsets. An example approach to determining the time deflections is described in greater detail below.

A data shifter 204 shifts the projection data readings for each detector pixel by a corresponding time deflection. A data re-sorter 206 corrects or compensates for the time offsets between the integration periods for the detector pixels 113. As a result, the fan-to-parallel beam re-binner 114 parallelizes the projections without angular interpolation. As noted above, omitting angular interpolation during re-binning allows for mitigating decreases in performance (e.g., decreased spatial resolution, increased streak artifact, increased computation time, etc.) associated in which the scanner 100 is configured to employ an angular interpolation for re-binning.

Described next in connection with FIGS. 3 and 4 is a non-limiting example of an angular interpolation free fan-to-parallel angular re-binning algorithm. Other algorithms are also contemplated herein.

Initially referring to FIG. 3, exemplary fan beam geometry 300 is graphically illustrated. First and second successive fan beams 302 and 304 are rotationally offset from each other in a rotation plane 306 by an angular increment ($\delta\alpha$) 308. Adjacent rays (e.g., rays 310 and 312 of the fan beam 302) are separated from each other by an angular increment ($\delta\beta$) 314.

A fan angle ($\beta$) 316 represents an angle between a ray (e.g., ray 318 of fan 302) and a line (e.g., line 320) that connects between an origin of the ray (e.g., origin 322) and a center of rotation 324. A canonic polar angle ($\theta$) 326 represents an angle between a ray (e.g., ray 328 of fan 304) and an x-axis 330.

In this embodiment, the rotating gantry 104 rotates in a clockwise direction 332 and the detector array 112 includes M columns of pixels 334, chronologically numbered in a counter-clockwise direction.

FIG. 4 graphically illustrates exemplary parallel beam geometry 400. Adjacent parallel beams (e.g., parallel beams 402 and 404) are rotationally offset from each other in the rotation plane 306 by an angular increment ($\delta\gamma$) 406. Again, for this example, the M detectors columns 334 are chronologically numbered in a counter-clockwise direction.

Using the notations of FIGS. 3 and 4, the canonic polar angle ($\theta$) of a ray (f) can be represented by EQUATION 1:

$$\theta(f_{m,n}) = (n-1)\cdot\delta\alpha - \delta\beta\cdot(m-m_c),\qquad\text{EQUATION 1:}$$

where the ray (f) belongs to fan beam n ($n \in \{1, 2 \ldots\}$)) and travels towards detector columns m ($m \in \{1, 2 \ldots M\}$), and $m_c$ represents a fractional detector pixel intersected by a line that connects the radiation source and the rotation center.

For fan-to-parallel beam re-binning, a ray is parameterized by the detector pixel m and the parallel projection or view v. Using this notation, the canonic angle of ($\theta$) belonging to the view v can be represented by EQUATION 2:

$$\theta(p_{m,v}) = \theta_0 + (v-1)\cdot\delta\gamma. \qquad\text{EQUATION 2:}$$

A fractional fan index ñ in which the ray emitted towards the detector pixel m is parallel to the reading $p_{m,v}$ is represented by EQUATION 3:

$$\tilde{n}(m, v) = 1 + \frac{\theta_0 + (v-1)\cdot\delta\gamma + (m-m_c)\cdot\delta\beta}{\delta\alpha} \qquad\text{EQUATION 3}$$

In the illustrated example, the integration period (IP) remains substantially the same during the scan, whereas the location of the rays along the time axis can vary between detector pixels 113, 334 by a time deflection. For a common cylindrical shaped data measurement system, the time deflection is united for the detector pixels 113, 334 belonging to the same column m (i.e., those pixels 113, 334 having the same footprint on the rotation plane). The time deflections for the different columns m can be represented by EQUATION 4:

$$dt_m = IP\cdot\mathrm{mod}\left(\frac{\theta_0 + (m-m_c)\cdot\delta\beta}{\delta\alpha}, 1\right), \qquad\text{EQUATION 4}$$

where mod(x,1)=x−floor(x). With some scanner geometries, the ratio $\delta\alpha/\delta\beta$ is an integer. In this case, the time deflections have a periodicity with a length that equals to this ratio.

Based on EQUATIONS 1 and 4, the canonic polar angle ($\theta$) for the time deflected ray can be represented by EQUATION 5:

$$\theta(f^r_{m,n}) = (n-1)\cdot\delta\alpha - \delta\beta\cdot(m-m_c) + \qquad\text{EQUATION 5}$$
$$\mathrm{mod}\left(\frac{\theta_0 + (m-m_c)\cdot\delta\beta}{\delta\alpha}, 1\right)\cdot\delta\alpha,$$

where the time deflected rays are represented in terms of superscript r.

Using the relationship n(m,v)=floor(ñ(m,v)), where $\delta\gamma = k\cdot\delta\alpha$ and k is an integer, the above equations can be combined to render the equality of EQUATION 6:

$$\theta(f^r_{m,n(m,v)}) = \theta(P_{m,v}), \qquad\text{EQUATION 6:}$$

which can be used to obtain parallel beam rays from the fan beam rays based on EQUATION 7:

$$P_{m,v} = f^r_{m,n(m,v)}, \qquad\text{EQUATION 7:}$$

which re-sorts the fan beam rays to parallel beam rays without angular interpolation. As such, the loss of spatial resolution and/or increase in artifact that occurs with configurations in which the fan-to-parallel re-binning utilizes angular interpolation is mitigated.

For the above example, rays of different detector rows correspond to the same detector column having the same footprint on the rotation plane and the rays were equiangular with an angular increment of $\delta\beta$. It is to be understood that the above also applies for an arbitrarily shaped detector array in which detector pixels have their own fan angle $\beta$. Non-limiting examples include a hexagonal array, an array with rows staggered with respect to each other, a spherical array, etc.

To generalize the approach described herein for an arbitrarily shaped detector array, the term $\delta\beta \cdot (m-m_c)$ in the equations herein can be replaced with $\delta\beta \cdot (m-m_c) \Rightarrow \beta(p)$, where p is the detector pixel index contained in a one dimensional series of indices that counts in a one to one correspondence all the pixels within the two dimensional array. Based on this substitution, time deflection for an arbitrary shape of detector array can be represented as shown in EQUATION 8:

$$dt_p = IP \cdot \mathrm{mod}\left(\frac{\theta_0 + \beta(p)}{\delta\alpha}, 1\right). \quad \text{EQUATION 8}$$

The deflection defined by EQUATION 8 can also be used in instance in which the focal spot is modulated in time scales of the order of the integration period. This may require a smearing of some of the rays along a direction determined based on the direction of the focal spot modulation.

FIGS. 5, 6 and 7 graphically illustrate a non-limiting example of the above for $\theta_0=0$, $m_c=5.5$ and $\delta\beta/\delta\alpha=\frac{1}{4}$.

Initially referring to FIG. 5, a y-axis 502 represents the time of deflection in units of the integration period and an x-axis 504 represents the detector column (m). For brevity and clarity, time deflections for $m \in \{1:10\}$ are shown. Note that with $\delta\beta/\delta\alpha=\frac{1}{4}$, the time deflection repeats itself every four detector columns. Hence, a time deflection 506 corresponds to $m=1, 5, 9, \ldots$, a time deflection 508 corresponds to $m=2, 6, 10, \ldots$, a time deflection 510 corresponds to $m=3, 7, \ldots$, and a time deflection 512 corresponds to $m=4, 8, \ldots$.

In FIG. 6, a y-axis 602 represents the time axis in units of IP and an x-axis 604 represents the detector column (m). Note the staggering 606, 608, 610 and 612 of the IP along the time axis 602 for the different detector columns.

In FIG. 7, a y-axis 702 represents the canonical angle $\theta$ in units of $\delta\beta$ and an x-axis 704 represents the detector column (m). Values of $\theta$ for a non-rotated ray are shown at 706. For clarity, the values of $\theta$ for other a non-rotated ray have been omitted. Values of $\theta$ for rays within parallel beam data are shown at 708. The column-dependent time deflections 508-512 shift the values from 706 to 708.

FIGS. 8 and 9 illustrate example non-limiting implementations of the approach described herein. With both figures, the time offset is performed by electronic circuitry controlling front-end detection electronics. This can be achieved by adding a controlled delay of the IP to the relevant required pixels.

FIG. 8 illustrates a non-limiting analog implementation 800. With the illustrated implementation, an analog delay control signal 802 sets a suitable delay of each analog delay circuits 804 based on time deflections, such as time deflections as determined as described herein. The delays delay the incoming IP signals 806, which are fed to channels 808 via switching circuits 810. FIG. 10 illustrates a corresponding delay timing diagram for the implementation of FIG. 8. A y-axis 1002 represents the IP signal, and an x-axis 1004 represents time. As shown, IP signals for different columns are delayed with delays $1006_k, 1006_2, \ldots, 1006_n$. It is to be appreciated that the delay can be set through an analog tap delay or an injected controlled current to capacitors.

FIG. 9 illustrates a non-limiting digital implementation 900. With the illustrated implementation, the incoming digital IP signals 902 are delayed by shifting the signals via a shift register 904 based on a high-speed clock 906. The shifted signals are switched by switching circuits 908 and fed to channels 910. FIG. 11 illustrates a corresponding delay timing diagram for the implementation of FIG. 9. A y-axis 1102 represents the IP signal, and an x-axis 1104 represents time. As shown, IP signals for different columns are delayed with delays $1106_1, 1106_2, \ldots, 1106_n$ based on the clock 1108.

With implementations in which the control delay accuracy and/or repeatability are below predetermined threshold values, the deviation of the deflection of each ray with respect to the nominal deflection can be stored and used by a fan-to-parallel re-binning that performs interpolations with weights that are based on those deviations.

FIG. 12 illustrates a method.

At 1202, a subject or object is scanned with a fan beam emitted by the radiation source 108.

At 1204, fan beam radiation is detected for a plurality of integration periods during the scan by a plurality of detector columns of the detector array 112.

At 1206, fan beam projection data is generated by of the detector array 112 for the detected radiation.

At 1208, time deflections are determined for the integration periods for the detector pixels (113).

At 1210, the fan beam projections are converted to parallel beam projections based on the time deflections, as described herein, without angular interpolation.

At 1212, the parallel beam data is reconstructed by the reconstructor 116 using a parallel beam reconstruction algorithm.

The above can be implemented by way of computer readable instructions, which when executed by a computer processor(s), cause the processor(s) to carry out the described acts. In such a case, the instructions are stored in a computer readable storage medium associated with or otherwise accessible to the relevant computer.

The invention has been described herein with reference to the various embodiments. Modifications and alterations may occur to others upon reading the description herein. It is intended that the invention be construed as including all such modifications and alterations insofar as they come within the scope of the appended claims or the equivalents thereof.

What is claimed is:

1. A fan-to-parallel beam re-binner, comprising:
   a time deflection determiner processor that determines time deflections for a plurality of integration periods for different detector pixels of an imaging system, wherein a time deflection corresponds to a time shift between a first measurement taken by a first detector pixel of the different detector pixels in a first time interval of an integration period and a first measurement taken by a second detector pixel of the different detector pixels in the same first time interval of the same integration period;
   a data shifter processor that shifts fan beam data acquired for the integration periods by the system by time offsets corresponding to the time deflections; and
   a data re-sorter that parallelizes the data.

2. The fan-to-parallel beam re-binner of claim 1, wherein a fan beam data reading is parallelized with a successive parallel beam projection.

3. The fan-to-parallel beam re-binner of claim 1, wherein the fan beam data is re-sorted without angular interpolation.

4. The fan-to-parallel beam re-binner of claim 1, wherein a time deflection for a particular detector pixel is based on a fan angle of the detector pixel.

5. The fan-to-parallel beam re-binner of claim 4, wherein the fan angle represents an angle between footprints of two imaginary lines on rotation plane; a first imaginary line that connects a radiation source of the system with a center of rotation of the system and a second imaginary line that connects the radiation source and the detector pixel.

6. The fan-to-parallel beam re-binner of claim 1, wherein the different detector pixels are part of a detector array that is arbitrarily shaped.

7. The fan-to-parallel beam re-binner of claim 1, wherein a same time offset is used for beam rays that have a same fan angle.

8. The fan-to-parallel beam re-binner of claim 7, wherein a dependence of the time offsets on the detector pixels is periodic.

9. The fan-to-parallel beam re-binner of claim 8, wherein the periodicity is based on a relationship between an angular increment of a radiation source between integration periods and an incremental fan angle between successive detector pixels.

10. The fan-to-parallel beam re-binner of claim 1, wherein the fan-to-parallel beam re-binner is a part of a reconstructor that utilizes at least one of an approximate, an exact or an iterative reconstruction algorithm based on a parallel beam back-projection.

11. A method, comprising:
obtaining fan beam data corresponding to measurements acquired by different detector pixels of an imaging system in a same interval of a same data acquisition integration period, wherein at least two of the measurements are shifted by a time offset with respect to each other;
determining the time offset for the different detector pixels; and
parallelizing data from the fan beam scan based on the time offsets.

12. The method of claim 11, further comprising:
determining a time offset for a detector pixel based on a fan angle of the detector pixel; and
shifting the integration periods for the detector pixel based on the time offset.

13. The method of claim 11, wherein the detector pixels are part of a cylindrically shaped detector array.

14. The method of claim 13, further comprising utilizing a same time offset for rays having a same fan angle.

15. The method of claim 14, wherein a dependence of the time offsets on the detector pixels is periodic.

16. The method of claim 15, wherein the periodicity is based on a relationship between an angular increment of a radiation source between integration periods and an incremental fan angle between successive detector pixels.

17. The method of claim 11, wherein an angular increment between parallel views of the parallel beam projection data is substantially equal to an integer times an angular increment of a source of radiation within an integration period.

18. The method of claim 11, further including reconstructing the parallel beam projection data with at least one of an approximate, an exact or an iterative parallel beam reconstruction algorithm.

19. A method, comprising:
obtaining fan beam data,
wherein the fan beam data includes projections acquired by detector pixels,
wherein a first projection acquired by a first detector pixel of the detector pixels for a first time interval of a first integration period is measured at a first time,
wherein a second projection acquired by a second detector pixel of the detector pixels for the same first time interval of the same first integration period is measured at a second time, and
wherein the first time and the second time are different times;
determining a time deflection that corresponds to a time offset between the first and the second times;
converting the fan beam data to parallel beam data without angular interpretation, wherein converting the fan beam data to the parallel beam data includes shifting the fan beam data by the time deflection offsets; and
reconstructing an image based on the parallel beam data.

20. The method of claim 19, wherein the offsets correspond to time deflections between integration periods for different detector pixels of the imaging system.

* * * * *